(12) United States Patent
Lee et al.

(10) Patent No.: US 10,891,401 B2
(45) Date of Patent: Jan. 12, 2021

(54) MOBILE TERMINAL HAVING SECURITY FUNCTION

(71) Applicant: BLUEBIRD INC., Seoul (KR)

(72) Inventors: Jang Won Lee, Seoul (KR); Moon Gyu Hong, Gyeonggi-do (KR); Chan Woong Park, Seoul (KR)

(73) Assignee: BLUEBIRD INC., Seoul (KR)

( * ) Notice: Subject to any disclaimer, the term of this patent is extended or adjusted under 35 U.S.C. 154(b) by 238 days.

(21) Appl. No.: 16/082,710

(22) PCT Filed: Mar. 7, 2016

(86) PCT No.: PCT/KR2016/002260
§ 371 (c)(1),
(2) Date: Sep. 6, 2018

(87) PCT Pub. No.: WO2017/155128
PCT Pub. Date: Sep. 14, 2017

(65) Prior Publication Data
US 2019/0122008 A1 Apr. 25, 2019

(51) Int. Cl.
| H04L 29/06 | (2006.01) |
| G06F 21/87 | (2013.01) |
| G06F 1/16 | (2006.01) |
| H04M 1/02 | (2006.01) |
| G06Q 20/40 | (2012.01) |
| G06F 21/78 | (2013.01) |
| G06Q 20/20 | (2012.01) |

(52) U.S. Cl.
CPC ............... *G06F 21/87* (2013.01); *G06F 1/16* (2013.01); *G06F 21/78* (2013.01); *G06Q 20/206* (2013.01); *G06Q 20/40* (2013.01); *H04M 1/02* (2013.01)

(58) Field of Classification Search
CPC ........ G06F 21/86; G06F 21/83; G06F 1/1626; G06F 3/0219; G06F 1/1658
USPC .......................................................... 726/34
See application file for complete search history.

(56) References Cited

U.S. PATENT DOCUMENTS

| 8,712,479 B2 * | 4/2014 | Lee .......................... G06F 3/044 455/566 |
| 2012/0018288 A1 * | 1/2012 | Rollet .................. H01H 13/705 200/5 A |
| 2013/0306450 A1 * | 11/2013 | Wolfe .................. H01H 9/0264 200/304 |

(Continued)

FOREIGN PATENT DOCUMENTS

| KR | 20140028841 A | 3/2014 |
| KR | 101541276 B1 | 8/2015 |

*Primary Examiner* — Evans Desrosiers
(74) *Attorney, Agent, or Firm* — Berenato & White, LLC

(57) ABSTRACT

Disclosed is a mobile terminal having a security function. The mobile terminal having a security function according to the present invention comprises: a case unit having a keypad for inputting data; a substrate unit, disposed inside the case unit, having a data input switch part operated by a keypad; and a tamper-resistant unit, disposed between a keypad and the data input switch part, having a tamper-proof conductive track part electrically connected to the substrate unit, wherein the tamper-proof unit includes a switch shielding part for shielding the data input switch part, and a connecting part for connection, connected to the switch shielding part and electrically connected to the substrate unit.

11 Claims, 7 Drawing Sheets

(56) References Cited

U.S. PATENT DOCUMENTS

| | | | |
|---|---|---|---|
| 2015/0008111 A1* | 1/2015 | Grenfell | H01H 13/79 200/5 A |
| 2015/0185864 A1* | 7/2015 | Schulz | G06F 21/83 341/22 |
| 2016/0026275 A1* | 1/2016 | Barrowman | G06F 1/1662 345/168 |

* cited by examiner

MOBILE TERMINAL HAVING SECURITY FUNCTION

CROSS-REFERENCE TO RELATED APPLICATIONS AND CLAIM TO PRIORITY

This application is a national stage application of International Application No. PCT/KR2016/002260 filed Mar. 7, 2016, the disclosures of which are incorporated herein by reference and to which priority is claimed.

FIELD OF THE INVENTION

The present invention relates to a mobile terminal having a security function, and more particularly, to a mobile terminal having a security function which may prevent tampering.

BACKGROUND OF THE INVENTION

Mobile terminals are freely carried and used regardless of places. Payment terminals used for credit cards, mobile communication terminals such as mobile phones, and personal digital assistants (PDA) called personal portable terminals are typical devices.

Accordingly, the term "mobile terminal" used herein includes all the above devices, but the following description focuses only on a payment terminal for convenience of explanation.

A payment terminal is provided with a keypad as an input device. In general, a keypad is a sort of a switch device for generating a signal through a key operation of a user or performing various additional functions.

In a general structure of the keypad, a plurality of keys on which numbers or letters are printed are provided. The keys are inserted in key holes provided on a front panel portion so that a part of a body thereof protrudes out of the front panel portion and the key inserted in the key hole is connected to a dome switch that is a sort of a push switch.

Also, a printed circuit board is provided on a bottom surface of the keypad. As the dome switch of the front panel portion is elastically deformed by a key push operation, the dome switch contacts a contact point provided on the printed circuit board, thereby generating a signal. Through this structure, a keypad of the payment terminal is operated and thus various financial services such as credit card approvals or password inputs may be used.

The payment terminal stores and processes lots of important data, for example, card number, expiration data, CVC information, etc. Thus, it is essential to apply to the payment terminal an anti-tampering device to prevent hardware or software tampering for hacking the important data.

One of the hardware tampering is to hack important data by forcibly opening the payment terminal and connecting a hacking device to a memory portion in the payment terminal. The tampering of a forcible opening type may be prevented by a sensor for recognizing forcible opening of the payment terminal and a controller for erasing information stored in a memory in response to a signal of the sensor.

Another hardware tampering is to physically destroy only a keypad, for example, to process a fine hole, without forcibly opening the payment terminal, and then connect a hacking device to a contact point of the printed circuit board to which the dome switch is connected, thereby hacking the important data stored in the payment terminal.

In particular, since the keys of the keypad are moved in a vertical direction by a push operation of a user, a gap is unavoidably formed between a keypad frame and the keys, which enables a physical intrusion of a hacking device.

Furthermore, in a general structure of the payment terminal, since the contact point of the printed circuit board is unavoidably arranged under the keypad, the payment terminal is weak at the tampering intruding into a keypad area. Thus, there is a demand for development of a mobile terminal capable of strongly dealing with the tampering intruding into the keypad area.

SUMMARY OF THE INVENTION

The present invention provides a mobile terminal having a security function, which includes an anti-tampering device capable of physically preventing tampering intruding into a keypad area, thereby detecting destruction of the anti-tampering device.

According to an aspect of the present invention, there is provided a mobile terminal having a security function, which includes a case unit having a keypad for inputting data, a substrate unit arranged inside the case unit and having a data input switch portion operated by the keypad, and an anti-tampering unit arranged between the keypad and the data input switch portion and having an anti-tampering conductive track portion electrically connected to the substrate unit, wherein the anti-tampering unit includes a switch shield portion shielding the data input switch portion, and a connection portion connected to the switch shield portion and electrically connected to the substrate unit.

The connection portion may extend toward a security shield space provided inside the substrate unit and electrically connected to a connection terminal provided in the security shield space.

The anti-tampering conductive track portion may include at least one track provided in at least one pattern of a zigzag pattern and a comb type pattern on one surface of at least one of the switch shield portion and the connection portion.

The anti-tampering conductive track portion may include a first track provided in a zigzag pattern on one surface of at least one of the switch shield portion and the connection portion, and a second track provided in a comb type pattern on one surface of each of the switch shield portion and the connection portion, and not contacting the first track.

The anti-tampering conductive track portion may further include a third track arranged adjacent to at least one of the first track and the second track, and not contacting the first track and the second track.

The anti-tampering unit may be formed of a flexible printed circuit board (FPCB).

The track may be provided on lower surfaces of the switch shield portion and the connection portion.

A via hole for extending a track provided on a lower surface of the connection portion toward an upper surface of the connection portion may be formed in the connection portion.

A via hole for extending a track provided on a lower surface of the switch shield portion toward an upper surface of the switch shield portion may not be formed in the switch shield portion.

The substrate unit may include an upper substrate having outer wall on which the data input switch portion is arranged, a lower substrate arranged under the upper substrate, and a security frame arranged between the upper substrate and the lower substrate and connected to the upper substrate and the lower substrate, forming the security shield space.

The connection terminal may be provided on an inner side wall of the upper substrate.

The substrate unit may further include a controller arranged in the security shield space, receiving a signal of the anti-tampering conductive track portion, and erase stored security information in response to a received signal of the anti-tampering conductive track portion.

The mobile terminal having a security function may further include a cover unit arranged on an upper surface of the anti-tampering unit and shielding the anti-tampering unit.

According to the embodiments of the present inventive concept, when a hacker tries to connect a hacking device to a data input switch portion by physically destroying a keypad area, an anti-tampering unit arranged between the keypad and the data input switch portion may prevent the hacking device from connecting to the data input switch portion. As the hacker's trial to physically destroy the anti-tampering unit is recognized through an anti-tampering conductive track portion, tampering intruding into the keypad area may be prevented.

DETAILED DESCRIPTION OF THE PREFERRED EMBODIMENT(S)

Figure 1:
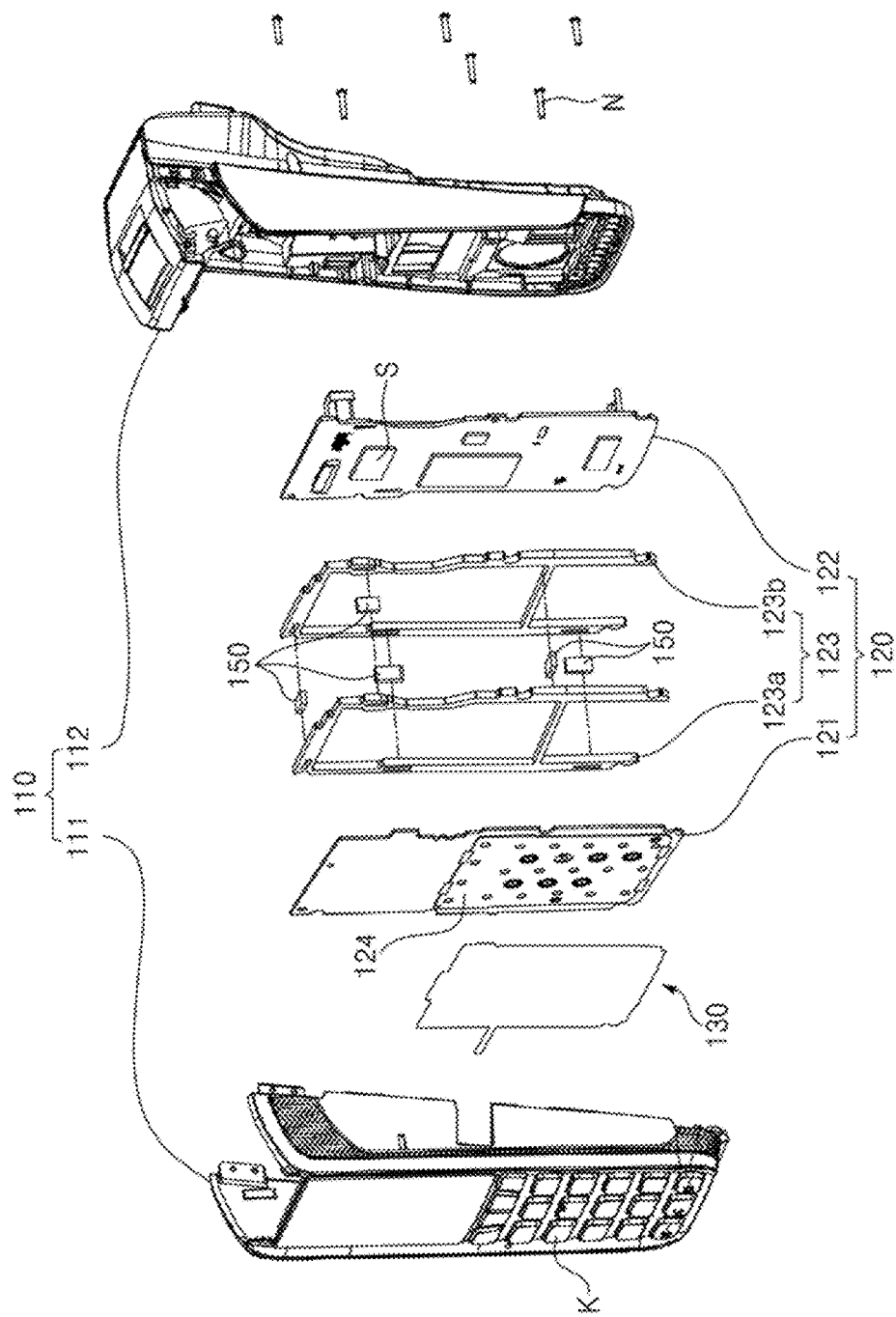
FIG. 1 is an exploded perspective view of a mobile terminal having a security function according to an embodiment.

The attached drawings for illustrating preferred embodiments of the present inventive concept are referred to in order to gain a sufficient understanding of the present inventive concept, the merits thereof, and the objectives accomplished by the implementation of the present inventive concept.

Hereinafter, the present inventive concept will be described in detail by explaining preferred embodiments of the inventive concept with reference to the attached drawings. Like reference numerals in the drawings denote like elements.

The term "mobile terminal" used herein includes payment terminals used for credit cards, mobile communication terminals such as mobile phones, and personal digital assistants (PDA) called personal portable terminals. However, in the following description, the term is indicated as a mobile terminal for convenience of explanation.

Figure 2:
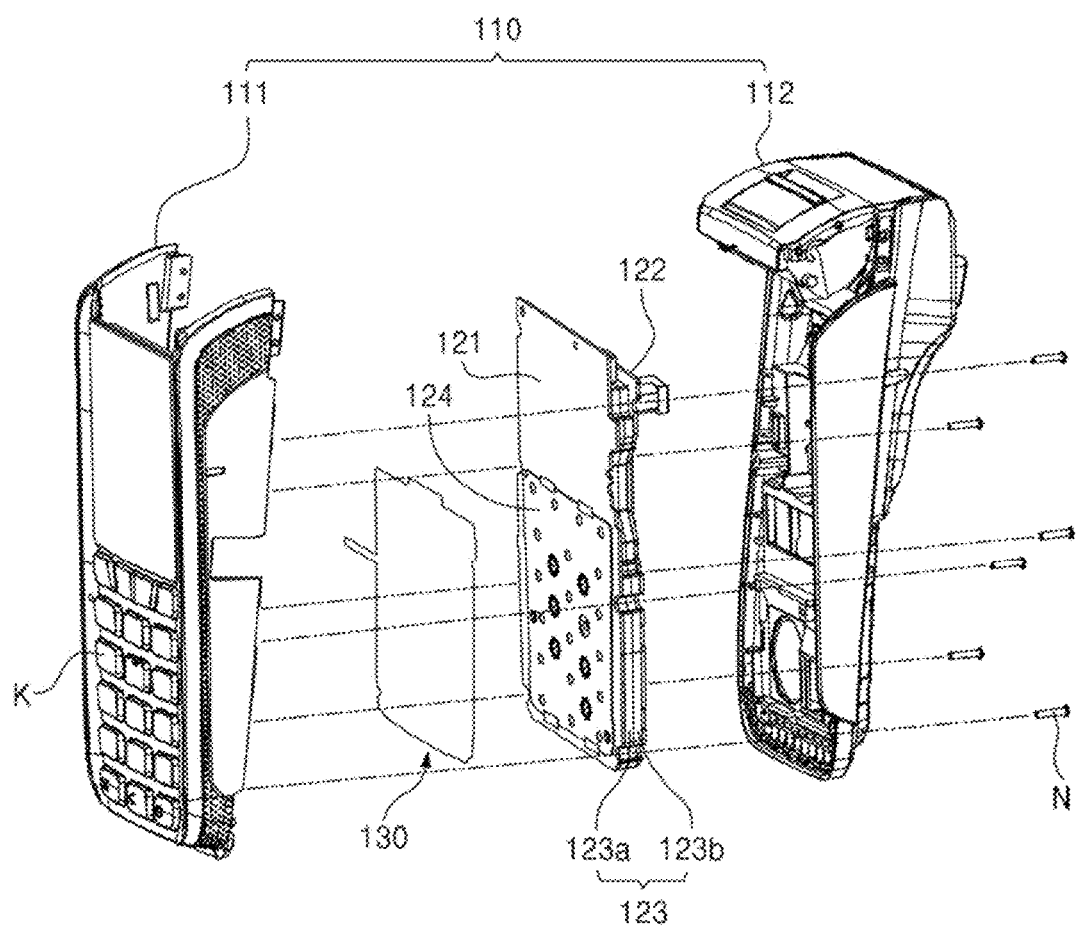
FIG. 2 is an exploded perspective view illustrating a state in which a substrate unit of FIG. 1 is coupled.
Figure 3:
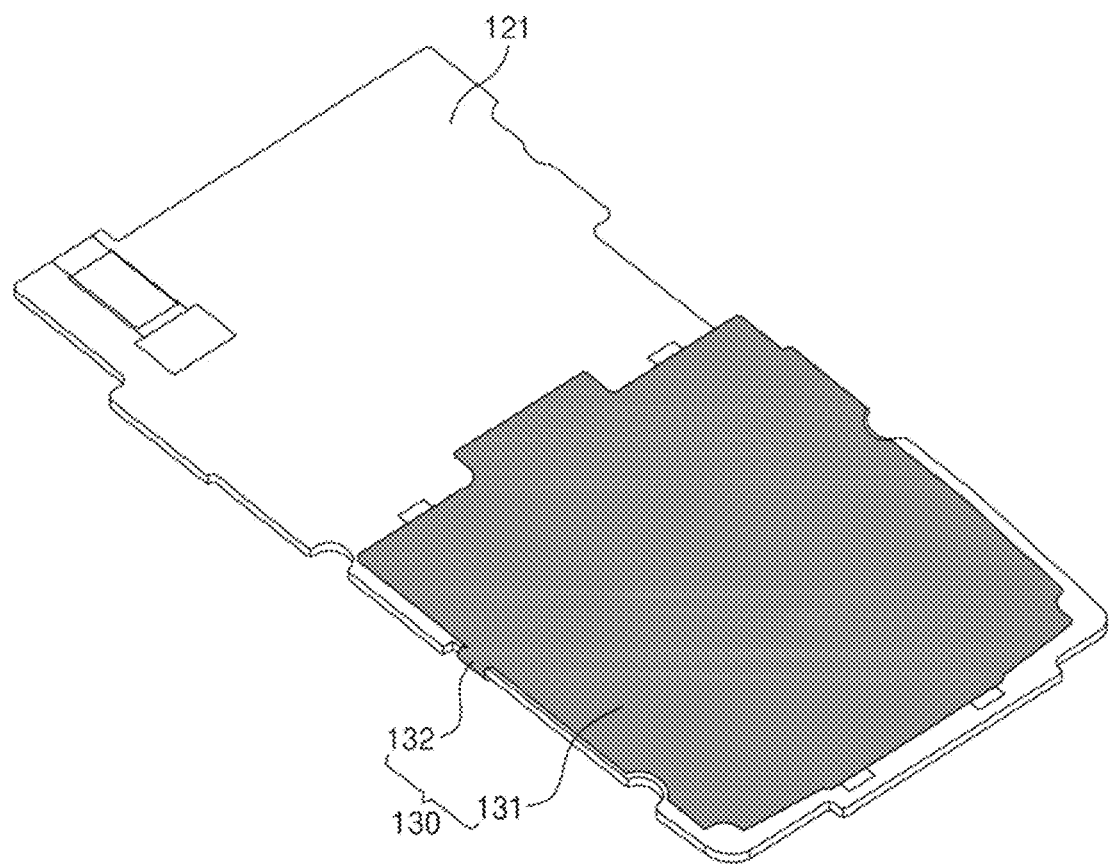
FIG. 3 illustrates a state in which anti-tampering unit is arranged on an upper substrate of FIG. 1.
Figure 4:
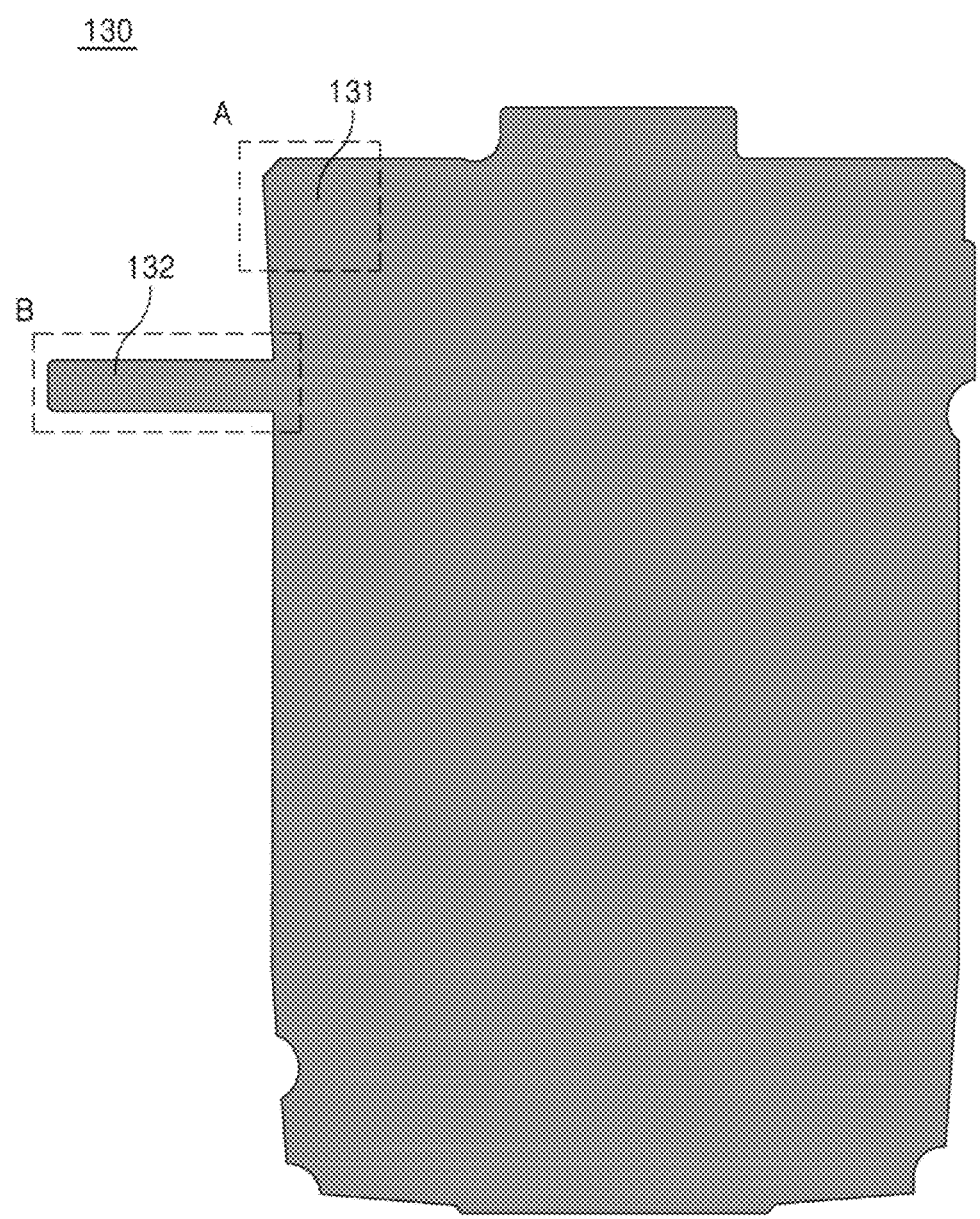
FIG. 4 is a plan view of the anti-tampering unit of FIG. 1.
Figure 5:
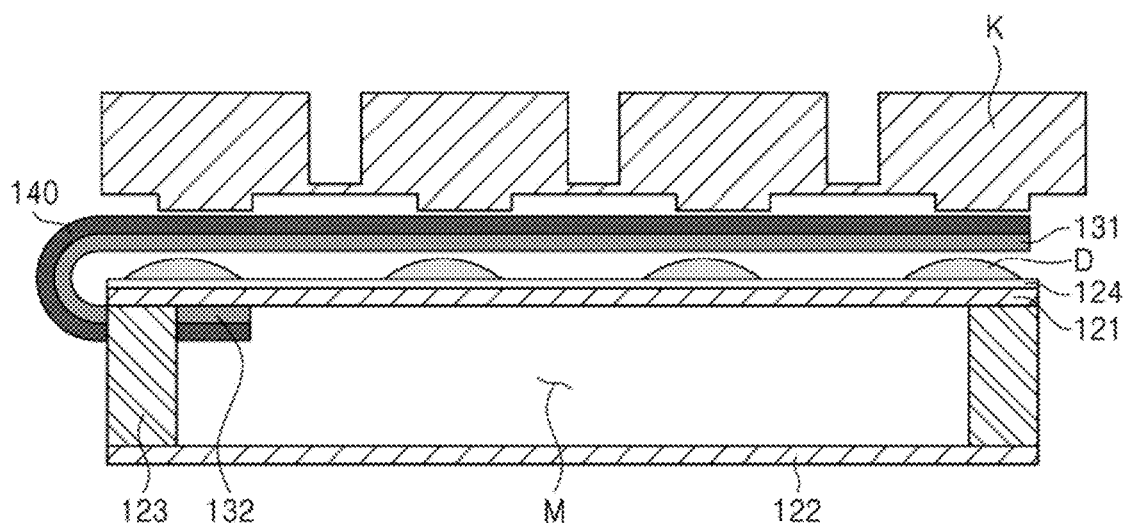
FIG. 5 schematically illustrates an arrangement structure of the anti-tampering unit of FIG. 1.
Figure 6:
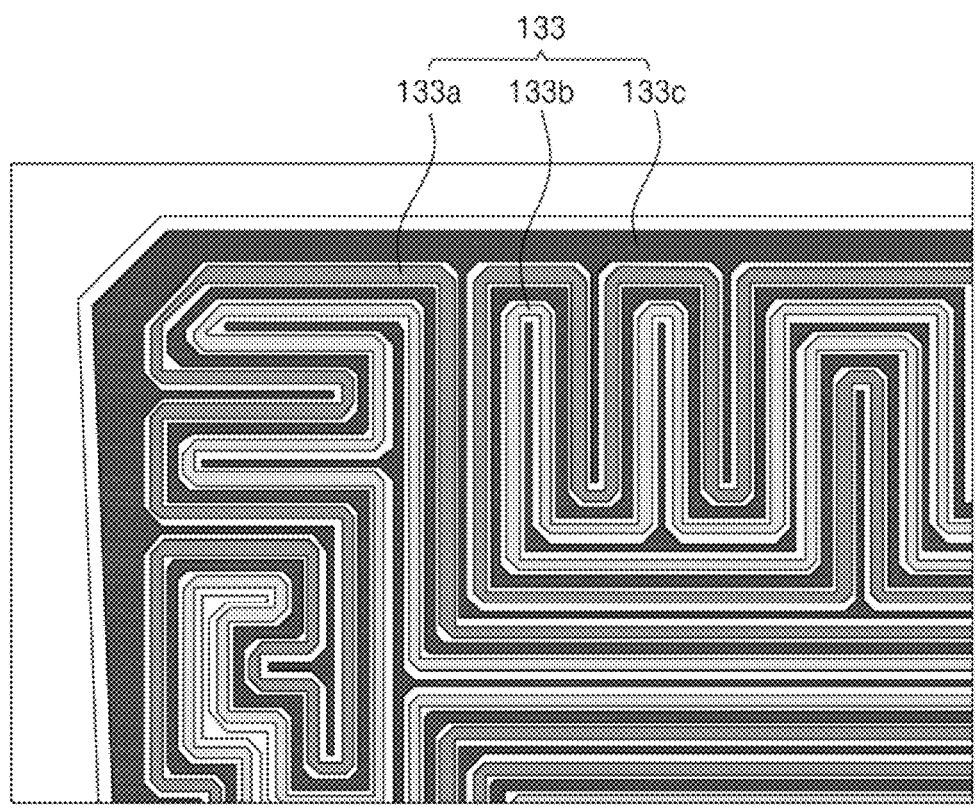
FIG. 6 is an enlarged view of a portion "A" of FIG. 4.
Figure 7:
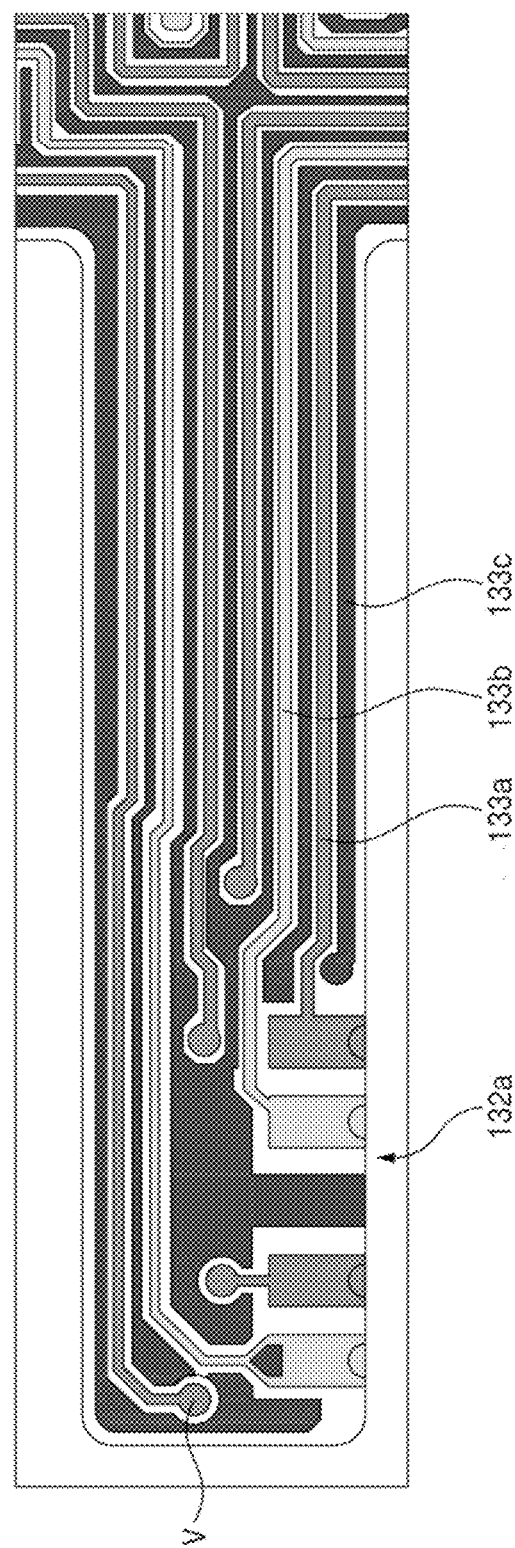
FIG. 7 is an enlarged view of a portion "B" of FIG. 4.

FIG. 1 is an exploded perspective view of a mobile terminal having a security function according to an embodiment. FIG. 2 is an exploded perspective view illustrating a state in which a substrate unit of FIG. 1 is coupled. FIG. 3 illustrates a state in which anti-tampering unit is arranged on an upper substrate of FIG. 1. FIG. 4 is a plan view of the anti-tampering unit of FIG. 1. FIG. 5 schematically illustrates an arrangement structure of the anti-tampering unit of FIG. 1. FIG. 6 is an enlarged view of a portion "A" of FIG. 4. FIG. 7 is an enlarged view of a portion "B" of FIG. 4.

As illustrated in FIGS. 1 to 7, a mobile terminal having a security function according to the present embodiment may include a case unit 110 having a keypad K for inputting data, a substrate unit 120 arranged inside the case unit 110 and having a data input switch portion 124 operated by the keypad K, and an anti-tampering unit 130 for preventing tampering through an area of the keypad K.

The case unit 110 protects the substrate unit 20 by surrounding the substrate unit 120 during assembly. In the present embodiment, the case unit 110 may include an upper case 111 and a lower case 112. The upper case 111 is provided with the keypad K.

The upper case 111 and the lower case 112 may be coupled by using a coupling member N such as a screw or a bolt. An opening into which a screw or a bolt may be inserted is formed in the lower case 112. A coupling portion (not shown) to which the coupling member N such as a screw or a bolt may be coupled is formed in the upper case 111. The coupling member N inserted into the opening of the lower case 112 may be coupled to the coupling portion formed in the upper case 111 by penetrating through the upper case 111 from the lower case 112.

The scope of rights of the present inventive concept is not limited thereto. In contrast, the coupling portion may be formed in the lower case 112 and the opening into which the coupling member N may be inserted may be formed in the upper case 111.

Meanwhile, the substrate unit 120 is arranged inside the case unit 110, that is, between the upper case 111 and the lower case 112. The substrate unit 120 may include the data input switch portion 124 arranged under the keypad K and operated by receiving a pressing force of a user pressing the keypad K. In the present embodiment, the data input switch portion 124 may include a dome switch D that is a sort of a push switch.

The substrate unit 120 may include an upper substrate 121 having an outer wall on which the data input switch portion 124 is arranged, a lower substrate 122 arranged under the upper substrate 121, and a security frame 123 arranged between the upper substrate 121 and the lower substrate 122 and connected to the upper substrate 121 and the lower substrate 122, forming a security shield space M.

In the present embodiment, the upper substrate 121 and the lower substrate 122 are formed of a printed circuit board (PCB). The upper substrate 121 and the lower substrate 122 are electrically connected to each other. Accordingly, information input through the data input switch portion 124 is transferred to a controller (not shown) that is described later.

The security shield space M is shielded in an upper side by the upper substrate 121, in a lower side by the lower substrate 122, and in a lateral side by the security frame 123. A security unit S is arranged in the security shield space M. The security unit S corresponds to a controller (not shown) for processing input information and issuing a control command and a memory portion (not shown) for storing security information such as a credit card number, an expiration date, or CVC information.

The controller is electrically connected to the anti-tampering unit 130 so as to erase security information stored in the memory portion when tampering to physically destroy or disable the anti-tampering unit 130 is detected.

As illustrated in FIGS. 1 and 2, the security frame 123 may include an upper security frame 123a and a lower security frame 123b connected to the upper security frame 123a.

A throughhole (not shown) through which a connection portion 132 penetrates to extend to the security shield space M is formed in the upper security frame 123a.

The lower security frame 123b is connected to an upper portion of the lower substrate 122, whereas the upper security frame 123a is connected to a lower portion of the upper substrate 121. A conductive portion (not shown) electrically connected to at least one of the upper substrate 121 and the lower substrate 122 is provided on the security frame 123.

As such, the security frame 123 is connected to the upper substrate 121 and the lower substrate 122 and shields the security unit S from a lateral direction, thereby preventing a hacking device intruding the security unit S in the lateral direction.

Meanwhile, an anti-tampering conductive track portion 133 arranged between the keypad K and the data input switch portion 124 and electrically connected to the substrate unit 120 is provided on the anti-tampering unit 130. The anti-tampering conductive track portion 133 is a track in which a current flows, and the controller may detect tampering to physically destroy the anti-tampering unit 130 through a change in resistance in the anti-tampering conductive track portion 133 or a short-circuit in the anti-tampering conductive track portion 133.

Accordingly, the anti-tampering unit 130 according to the present embodiment may prevent a hacker's trial to physically destroy the area of the keypad K and allow a hacking device to access the data input switch portion 124 by shielding the data input switch portion 124. When a hacker tries to physically destroy the anti-tampering unit 130, the anti-tampering unit 130 may transmit a signal corresponding to the above trial to the controller via the anti-tampering conductive track portion 133.

The anti-tampering unit 130 may include a switch shield portion 131 for shielding the data input switch portion 124, and the connection portion 132 connected to the switch shield portion 131 and electrically connected to the substrate unit 120. The connection portion 132 extends toward the security shield space M inside the substrate unit 120 and is electrically connected to a connection terminal (not shown) provided in the security shield space M.

The anti-tampering unit 130 may be formed of a flexible material. According to the present embodiment, the switch shield portion 131 and the connection portion 132 may be formed of a flexible printed circuit board (FPCB).

Since the switch shield portion 131 is formed of a flexible material, as the keypad K is pressed, the switch shield portion 131 is bent so that a pressing force of a user pressing the keypad K may be transferred to the data input switch portion 124. Furthermore, since the connection portion 132 is also formed of a flexible material, the connection portion 132 may be connected to the switch shield portion 131 provided above the substrate unit 120 and may extend toward the security shield space M inside the substrate unit 120.

Meanwhile, as described above, the connection portion 132 is connected to the substrate unit 120 in the security shield space M. A connector 132a to which the anti-tampering conductive track portion 133 is connected is provided in the connection portion 132. The connector 132a is electrically connected to the connection terminal arranged in the security shield space M. In the present embodiment, the connection terminal is provided on an inner side wall that is a side wall opposite to a side wall where a dome switch D of the upper substrate 121 is present.

As such, as the connection terminal is provided on the inner side wall of the upper substrate 121, the length of the connection portion 132 is reduced so that material costs may be reduced compared to a case in which the connection terminal is provided on the lower substrate 122.

Furthermore, as the connection terminal is provided on the inner side wall of the upper substrate 121, a lower surface of the connection portion 132 may be closely contacted with the upper substrate 121. Accordingly, compared to a case in which the connection terminal is provided on the lower substrate 122, exposure of the anti-tampering conductive track portion 133 provided on the lower surface of the connection portion 132 may be reduced so that the anti-tampering conductive track portion 133 provided on the connection portion 132 is difficult to be disabled.

Meanwhile, the anti-tampering conductive track portion 133 is provided on a lower surface of the anti-tampering unit 130. Accordingly, since the anti-tampering conductive track portion 133 is not exposed in a direction toward the keypad K, it is difficult for the hacker to disable the anti-tampering conductive track portion 133.

In the present embodiment, the anti-tampering conductive track portion 133 is provided in the anti-tampering unit 130 as a fine and complicated shape so that a hacker's trial to make a fine hole in the anti-tampering unit 130 may be detected and the disablement of the anti-tampering conductive track portion 133 by the hacker is made difficult.

Accordingly, according to the present embodiment, at least one track in at least one of a zigzag pattern and a comb type pattern is provided on one surface of at least one of the switch shield portion 131 and the connection portion 132. The number of tracks may be various and, in the following description, a case of three tracks is described for convenience of explanation.

According to the present embodiment, the anti-tampering conductive track portion 133 may include a first track 133a provided in a zigzag pattern and a second track 133b provided on surfaces of the switch shield portion 131 and the connection portion 132 in a comb type pattern and not contacting the first track 133a, on one surface of at least one of the switch shield portion 131 and the connection portion 132.

The first track 133a is formed in a zigzag pattern, as illustrated in FIG. 6. In the present embodiment, although the zigzag pattern may be formed in a regular pattern in some area of the anti-tampering unit 130, the zigzag pattern is formed in an irregular pattern in view of the whole area of the anti-tampering unit 130 so as to make it difficult for the hacker to recognize regularity of the zigzag pattern.

The second track 133b, as illustrated in FIG. 6, is provided in the comb type pattern on one surface of each of the switch shield portion 131 and the connection portion 132 and not contacting the first track 133a. In the present embodiment, although the comb type pattern may be formed in a regular pattern in some area of the anti-tampering unit 130, the comb type pattern is formed in an irregular pattern in view of the whole area of the anti-tampering unit 130 so as to make it difficult for the hacker to recognize regularity of the comb type pattern.

As such, according to the present embodiment, since the anti-tampering conductive track portion 133 includes the first track 133a formed in a zigzag pattern and the second track 133b formed in a comb type pattern, the patterns of the first track 133a and the second track 133b are different from each other so that it is difficult for the hacker to disable the anti-tampering unit 130.

In other words, to disable the anti-tampering unit 130, the hacker needs to disable both of the first track 133a and the second track 133b, that is, each of the first track 133a and the second track 133b by separating the first track 133a and the second track 133b having different patterns. Thus, it is very difficult to disable the anti-tampering unit 130 according to the present embodiment.

Furthermore, according to the present embodiment, the anti-tampering conductive track portion 133 is arranged adjacent to at least one of the first track 133a and the second track 133b, and may further include a third track 133c that does not contact the first track 133a and the second track 133b.

As the third track 133c is arranged adjacent to the first track 133a and the second track 133b, a trial to disable the first track 133a or the second track 133b is made difficult. For example, when the hacker tries to connect one end and the other end of the first track 133a using a wire (not shown) and make a hole in the first track 133a therebetween, (in this case, since a current flows along the wire, even when the one end and the other end of the first track 133a is disconnected by the hole, the controller may not recognize the disconnection of the first track 133a), and the wire is not accurately connected only to the first track 133a and contacts the third track 133c, the first track 133a and the third track 133c are short-circuited and accordingly the controller may recognize tampering.

Meanwhile, since the first track 133a to the third track 133c are very densely formed on the lower surface of the anti-tampering unit 130, a via hole V for extending the first track 133a to the third track 133c formed on the lower surface of the anti-tampering unit 130 toward an upper surface of the anti-tampering unit 130 may be formed in the anti-tampering unit 130 to facilitate pattern forming of the first track 133a to the third track 133c.

However, when the via hole V is formed in the switch shield portion 131 for shielding the data input switch portion 124, the first track 133a to the third track 133c are extended to the upper surface of the switch shield portion 131 and exposed therefrom, it may be easy for the hacker to attack the first track 133a to the third track 133c that are exposed.

Furthermore, since the size of the via hole V is larger than the sizes of the first track 133a to the third track 133c, the via hole V may be an easy target for the hackers and thus preventing exposure of the via hole V as much as possible facilitates anti-tampering.

Accordingly, in the present embodiment, since the via hole V is not formed in the switch shield portion 131, the first track 133a to the third track 133c are prevented from being formed on the upper surface of the switch shield portion 131. Furthermore, in the present embodiment, even when the via hole V is formed in the anti-tampering unit 130, the via hole V is formed in the connection portion 132 that is protected by the security shield space M, not in the switch shield portion 131, the dense pattern formation of the first track 133a to the third track 133c is facilitated and the via hole V is prevented from being exposed to the hacker.

Meanwhile, according to the present embodiment, the mobile terminal having a security function may further include a cover unit 140 arranged on the upper surface of the anti-tampering unit 130 and shielding the anti-tampering unit 130.

The cover unit 140 is arranged between the upper case 111 and the anti-tampering unit 130 and shielding the anti-tampering unit 130. The cover unit 140 is formed of a flexible and hard material so as to protect the anti-tampering unit 130 from the hacker's physical attack.

Meanwhile, according to the present embodiment, the mobile terminal having a security function may further comprise an anti-tampering conductive portion 150 arranged between the upper substrate 121 and the lower substrate 122 and electrically connected to at least one of the upper substrate 121 and the lower substrate 122, thereby recognizing forcible disassembly of the case unit 110.

The anti-tampering conductive portion 150 is pressed by the coupling member N that penetrates through the upper case 111 and the lower case 112 during the assembly of the upper case 111 and the lower case 112.

The anti-tampering conductive portion 150 may be formed of conductive rubber having conductivity and elasticity, whose electric resistance value varies according to a change in a degree of compression. Accordingly, when a degree of pressing the upper case 111 and the lower case 112 decreases, a resistance value of the anti-tampering conductive portion 150 is changed.

The controller recognizes the above changed resistance value of the anti-tampering conductive portion 150 and erases the security information stored in the memory portion when a trial to forcibly disassemble the case unit 110.

Furthermore, the anti-tampering conductive portion 150 is electrically connected to at least one of the upper security frame 123a and the lower security frame 123b. As such, as the anti-tampering conductive portion 150 is electrically connected to the upper security frame 123a or the lower security frame 123b, the anti-tampering conductive portion 150 may detect a trial to physically destroy the upper security frame 123a and the lower security frame 123b.

An operation of the mobile terminal having a security function configured as above is described below with reference to FIGS. 1 to 7.

According to the present embodiment, the anti-tampering unit 130 may be arranged between the keypad K and the data input switch portion 124 to shield the data input switch portion 124 so that a hacker's trial to physically destroy the area of the keypad K and connect a hacking device to the data input switch portion 124 may be prevented.

Furthermore, when the hacker tries to physically destroy the anti-tampering unit 130, the anti-tampering unit 130 may inform the trial to the controller via the anti-tampering conductive track portion 133.

Furthermore, since the connection portion 132 that electrically connects the anti-tampering unit 130 to the substrate unit 120 extends toward the security shield space M surrounded by the upper substrate 121, the lower substrate 122, and the security frame 123, the hacker's trial to disable the anti-tampering unit 130 by attacking the electrical connection portion of the connection portion 132 and the upper substrate 121 may be made very difficult.

Furthermore, as the tracks 133a, 133b and 133c provided in the switch shield portion 131 and the connection portion 132 of the anti-tampering unit 130 are formed in different patterns, the hacker's trial to disable the anti-tampering unit 130 may be made difficult.

As such, for the hacker's trial to physically destroy the area of the keypad K to connect the hacking device to the data input switch portion 124, the mobile terminal having a security function according to the present embodiment may prevent tampering of intruding the area of the keypad K as the anti-tampering unit 130 arranged between the keypad K and the data input switch portion 124 prevents the hacking device from connecting to the data input switch portion 124.

Furthermore, for the hacker's trial to physically destroy the anti-tampering unit 130, the mobile terminal having a security function according to the present embodiment recognizes the trial through the anti-tampering conductive track portion 133 provided in the anti-tampering unit 130 so as to effectively deal with the tampering of intruding the area of the keypad K.

While the present inventive concept has been particularly shown and described with reference to preferred embodiments using specific terminologies, the embodiments and terminologies should be considered in descriptive sense only and not for purposes of limitation.

Therefore, it will be understood by those of ordinary skill in the art that various changes in form and details may be made therein without departing from the spirit and scope of the present inventive concept as defined by the following claims. Accordingly, the corrected examples or modified examples are deemed to belong to the scope of patent rights of the present inventive concept.

INDUSTRIAL APPLICABILITY

The present inventive concept may be applied to an industrial field of mobile terminals.

The invention claimed is:

1. A mobile terminal having a security function, the mobile terminal comprising:
   a case unit having a keypad for inputting data;
   a substrate unit arranged inside the case unit and having a data input switch portion operated by the keypad; and
   an anti-tampering unit arranged between the keypad and the data input switch portion and having an anti-tampering conductive track portion electrically connected to the substrate unit,
   wherein the anti-tampering unit comprises:
      a switch shield portion shielding the data input switch portion; and
      a connection portion connected to the switch shield portion and electrically connected to the substrate unit, and
   wherein the anti-tampering conductive track portion comprises:
      a first track provided in a zigzag pattern on one surface of at least one of the switch shield portion and the connection portion; and
      a second track provided in a comb-type pattern on one surface of each of the switch shield portion and the connection portion, and not contacting the first track.

2. The mobile terminal having a security function of claim 1, wherein the connection portion extends toward a security shield space provided inside the substrate unit and electrically connected to a connection terminal provided in the security shield space.

3. The mobile terminal having a security function of claim 1, wherein the anti-tampering conductive track portion further comprises a third track arranged adjacent to at least one of the first track and the second track, and not contacting the first track and the second track.

4. The mobile terminal having a security function of claim 1, wherein the anti-tampering unit is formed of a flexible printed circuit board (FPCB).

5. The mobile terminal having a security function of claim 4, wherein the track is provided on lower surfaces of the switch shield portion and the connection portion.

6. The mobile terminal having a security function of claim 5, wherein a via hole for extending a track provided on a lower surface of the connection portion toward an upper surface of the connection portion is formed in the connection portion.

7. The mobile terminal having a security function of claim 5, wherein a via hole for extending a track provided on a lower surface of the switch shield portion toward an upper surface of the switch shield portion is not formed in the switch shield portion.

8. The mobile terminal having a security function of claim 2, wherein the substrate unit comprises:
   an upper substrate having outer wall on which the data input switch portion is arranged;
   a lower substrate arranged under the upper substrate; and
   a security frame arranged between the upper substrate and the lower substrate and connected to the upper substrate and the lower substrate, forming the security shield space.

9. The mobile terminal having a security function of claim 8, wherein the connection terminal is provided on an inner side wall of the upper substrate.

10. The mobile terminal having a security function of claim 8, wherein the substrate unit further comprises a controller arranged in the security shield space, receiving a signal of the anti-tampering conductive track portion, and erase stored security information in response to a received signal of the anti-tampering conductive track portion.

11. The mobile terminal having a security function of claim 1, further comprising a cover unit arranged on an upper surface of the anti-tampering unit and shielding the anti-tampering unit.

* * * * *